Sept. 26, 1967  R. D. KNIGHT  3,344,289
NUCLEAR BATTERY
Filed Nov. 19, 1965

INVENTOR
ROBERT D. KNIGHT

By Edward W. Brown

ATTORNEY

United States Patent Office 3,344,289
Patented Sept. 26, 1967

3,344,289
NUCLEAR BATTERY
Robert D. Knight, Berkeley, Calif., assignor to International Business Machines Corporation, Armonk, N.Y., a corporation of New York
Filed Nov. 19, 1965, Ser. No. 508,783
5 Claims. (Cl. 310—3)

The present invention relates to the generation of electrical energy and, more particularly, relates to a nuclear battery for utilizing the electrical energy of nuclear reactions.

Heretofore, the simplest type of nuclear battery, called the beta-current cell, consists of an emitter electrode coated with a beta-emitting radioactive material and a collector electrode. Negative beta particles, which are emitted from beta-active material, are collected by the collector and thereby produce an electrical current. By filling the space between the emitter and the collector with an insulating or dielectric material, such as polyethylene or polystyrene, the beta particles of high energy from the emitter are able to penetrate the dielectric and reach the collector, but the flow of low energy electrons in the reverse direction is prevented. In this type of prior art battery, the radioactive material is a solid material, such as strontium 90 in the form of strontium chloride, because it has to be coated on the emitter electrode. Cheaper gaseous radioactive materials of higher energy, such as krypton 85, have been used, but, to do so, the battery must include a high pressure container for the gas of which the inner wall serves as the emitter. This is undesirable because the beta particle must traverse the complete thickness of the emitter in traveling to the collector. Further, if the container is broken open, persons in its presence will be exposed to the radioactive gas.

It is the primary object of the present invention to provide a nuclear battery which enables the utilization of gaseous radioactive materials without resorting to high pressure containers.

Another object of the present invention is to provide a nuclear battery of improved construction so that gaseous radioactive materials can be safely used without endangering the health of the person using it, even when the battery is broken open.

A further object of the present invention is to provide a nuclear battery having a geometric arrangement such that the efficiency of collecting the beta particles is essentially doubled.

Still another object of the present invention is to provide a nuclear battery of improved construction so that it is small in size and weight and is simple to manufacture.

In general, the foregoing and other objects and other advantages of the invention are achieved by a nuclear battery having, for the emitter, a solid continuous metallic element in which the radioactive material is physically incorporated and essentially uniformly dispersed, thereby permitting the utilization of gaseous radioactive material. Further, the emitter, collector, and dielectric of the nuclear battery preferably are in the form of films or sheets which are coiled up into a cylinder such that the emitter film is substantially surrounded on both sides by the collector film and is separated from the collector by the dielectric. With this construction, the efficiency of collecting the beta particles is essentially doubled.

Other and further objects and advantages of the invention will be apparent in the following more particular description of the preferred embodiments of the invention, as illustrated in the accompanying drawing, in which.

Figure 1:
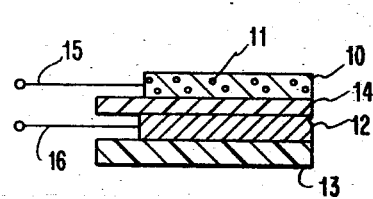
FIGURE 1 is a schematic drawing of the nuclear battery in which only one collector is utilized.

In FIGURE 1, there is shown an emitter electrode 10 of a conductive metal, such as aluminum, which serves as one of the electrodes and, according to one aspect of the present invention, a binder for a beta-emitting radioactive material 11, preferably gaseous krypton 85. To minimize the self-absorption of the beta particles by the emitter, it preferably is a thin film. Spaced from the emitter 10 is a collector electrode 12, which may be formed of this same conductive metal as the emitter and, if desired, carried on a supporting substrate 13. Alternatively, the collector electrode may be formed of a metal having a high absorption capability for beta particles, for example, a high atomic number element such as lead. Intermediate the emitter electrode 10 and the collector electrode 12, an insulating or dielectric material 14 is disposed. This material 14 has a low absorption for the high energy beta particles but a sufficient resistivity to prevent the flow of back-scattered electrons of relatively lower energy from the collector. Dielectrics having resistivities at least of the order of $10^{10}$ ohm-cm. are suitable. Examples of such dielectrics are: polystyrene, polyethylene, and polyethylene terephthalate, the latter being preferred over the others.

When the preferred krypton 85 radioactive material is desired to be used, the emitter 10 is formed by sputtering a conductive metal, such as aluminum, in the presence of the inert krypton 85 gas. As the molten metal particles are deposited, they trap the gas within the sputtered film and as much as 10 mole per cent is incorporated in the film.

In operation, the high energy, negatively-charged beta particles emitted by the radioactive material in the emitter electrode 10 of FIGURE 1 pass out of the emitter and through the dielectric 14 to the collector electrode 12 where they are absorbed almost completely to charge the electrode to a voltage, which is negative with respect to the potential of the emitter. The electric energy of this potential may be utilized to supply current by leads 15, 16 and, hence, power to a desired circuit (not shown).

Figure 2:
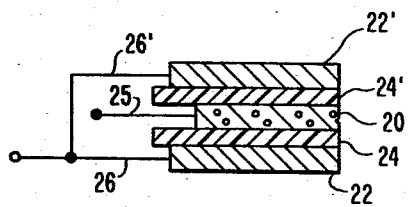
FIGURE 2 is a schematic drawing of the nuclear battery in which two collectors are employed.

According to another aspect of the present invention, FIGURE 2 shows a pair of collectors 22, 22' on opposite sides of an emitter 20. Again, the emitter and the electrodes are separated by a dielectric material 24, 24'. Since the radioactive material is uniformly dispersed throughout the emitter, beta particles are emitted out of both sides of the emitter and, therefore, by positioning a collector on opposite sides of the emitter the efficiency of the collection of beta particles is essentially doubled. Lead 25 from the emitter 20 and leads 26, 26' from collectors 22, 22', respectively, which are electrically connected together, supply current to the desired circuit (not shown).

Figure 3:
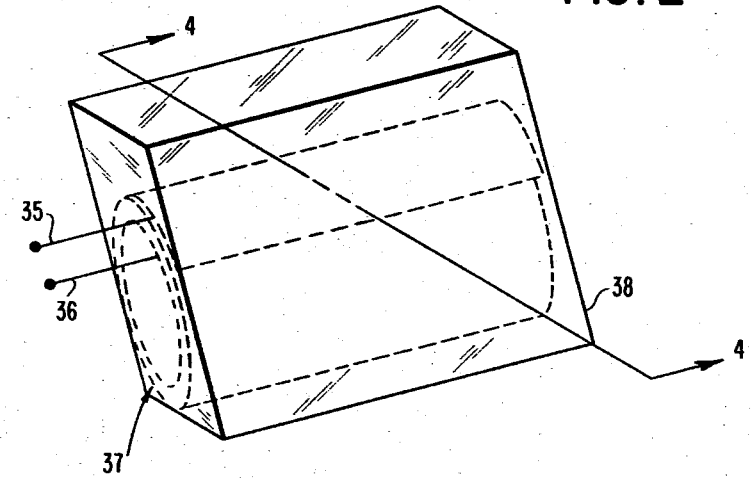
FIGURE 3 is a perspective drawing of the preferred embodiment of the nuclear battery.
Figure 5:
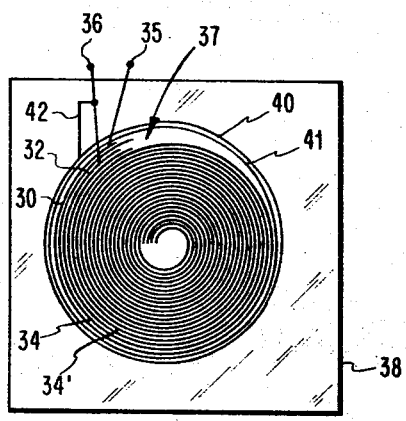
FIGURE 5 is a cross-sectional view, taken along 4—4 in FIGURE 3, and shows a modification of the preferred embodiment.
Figure 4:
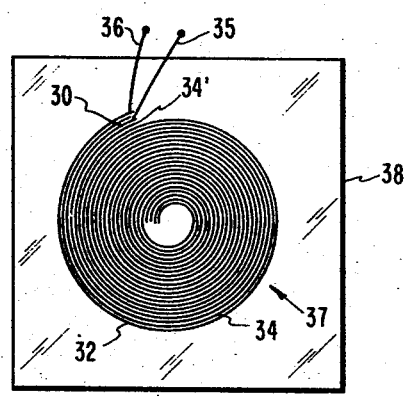
FIGURE 4 is a cross-sectional view, taken along line 4—4 in FIGURE 3, of the preferred embodiment of the nuclear battery and shows the emitter, collector, and dielectric films coiled up in the form of a cylinder.

According to still another aspect of the present invention, the preferred embodiment of the nuclear battery is shown in FIGURES 3 and 4, and comprises films of the emitter, collector, and dielectric coiled or rolled up into a cylinder 37. The films preferably are four in number and are arranged in the following sequence, starting from the top of the cylinder—collector 32, dielectric 34, emitter 30, dielectric 34'. By this arrangement, each turn of the emitter 30 in the cylinder is surrounded on each side by a turn of the collector 32 and is separated from the collector by either dielectric 34 or dielectric 34'. Thus, the configuration of FIGURE 2 is present and the efficiency of the collection of beta particles is essentially doubled. Leads 35, 36 from the collector and emitter, respectively, may be utilized to supply current to a circuit (not shown).

The thickness dimensions of the films in the preferred embodiment are as follows:

(a) 20,000–25,000 A. of aluminum for the emitter 30 so as to minimize self-absorption of the beta particles;

(b) 1 mil/400–4000 volts of test voltage for dielectrics 34, 34' of polyethylene terephthalate—1 mil/1000 volts being preferred;

(c) 3.5 mils of lead for the collector 32 so as to absorb 90% of the beta particles emitted from the preferred krypton 85.

For safety reasons, the entire cylinder 37 preferably is encapsulated in a material 38 capable of absorbing any free beta particles and gamma rays in the radioactive material emits gamma rays. Suitable materials for this encapsulation are synthetic having high resistivities ($>10^{10}$), such as polystyrene, polyethylene, polyethylene terephthalate, and epoxy resins, the latter being preferred. Alternatively, the cylinder 37 can be wrapped in one of the above resins, preferably polyethylene terephthalate and encased in a metallic cylindrical container. If the radioactive is a gamma emitter, as well as a beta emitter, a lead container is preferred.

Alternatively, the sequence of the films or sheets can be changed to the following top-to-bottom sequence— emitter 30, dielectric 34, collector 32, dielectric 34'. When the films in this sequence are coiled into the cylinder 37, substantially both sides of the emitter 30 are surrounded on each side by a turn of the collector 32, except for the exterior side of the outermost turn of the emitter. To collect the beta particles emitted from this exterior side of the emitter 30, a substantially cylindrical collector electrode 40 preferably is disposed around the cylinder 37. This electrode 40 is separated from the exterior side by an additional dielectric material 41 and electrically connected to collector electrode 32. Thus, by the addition of this electrode, each side of the emitter 30 now is completely surrounded either by the collector 32 or the collector 40. An additional lead 42 from the collector 40 is connected to the lead 36 from collector 32.

From the foregoing, it can be seen that the instant invention is directed to a new and improved nuclear battery, which is structurally simple and easy to fabricate, and is highly efficient in operation.

While the invention has been particularly shown and described with reference to preferred embodiments thereof, it will be understood by those skilled in the art that variations in form may be made therein without departing from the spirit and scope of the invention.

What is claimed is:

1. A nuclear battery having an emitter electrode in the form of a thin film of conductive metal, a collector electrode in the form of a thin film and separated from the emitter electrode by a first dielectric film, a gaseous radioactive beta particle emitting material in electrical contact with and physically incorporated in said emitter electrode, said emitter electrode, dielectric film, and collector electrode being coiled into a cylinder, a second dielectric film separating the sides of the emitter electrode and the collector electrode opposite the sides separated by said first dielectric film, said radioactive material being disposed with said emitter electrode such that beta particles are emitted from both sides of the emitter, thereby essentially doubling the collection efficiency of the beta particles.

2. The nuclear battery of claim 1 wherein the sequence of films composing the cylinder, starting with the outermost film, is the collector, the first dielectric film, the emitter electrode and the second dielectric film.

3. The nuclear battery of claim 1 wherein the films composing the cylinder, starting from the outermost film, is the emitter electrode, the first dielectric film, the collector electrode, and the second dielectric film.

4. The nuclear battery of claim 3 wherein a cylindrical electrode surrounds the cylinder and is separated from the cylinder by an additional dielectric film.

5. The nuclear battery of claim 1 wherein said gas is krypton 85.

References Cited

UNITED STATES PATENTS

| | | | |
|---|---|---|---|
| 2,661,431 | 12/1953 | Linder | 310—3 |
| 2,930,909 | 3/1960 | Lieb | 310—3 |
| 3,074,811 | 1/1963 | Coleman | 117—107 X |

OTHER REFERENCES

Chleck, Development of Krypton 85 as a Universal Tracer, Nuclear Science Abstracts, November 15, 1964, volume 18, Number 21, pp. 5039.

RODNEY D. BENNETT, *Primary Examiner.*

CHESTER L. JUSTUS, *Examiner.*

B. L. RIBANDO, *Assistant Examiner.*